Feb. 17, 1931.     R. C. ROSE     1,792,930
MOTOR CAR DIRECTION SIGNAL
Filed Sept. 17, 1930    2 Sheets-Sheet 1
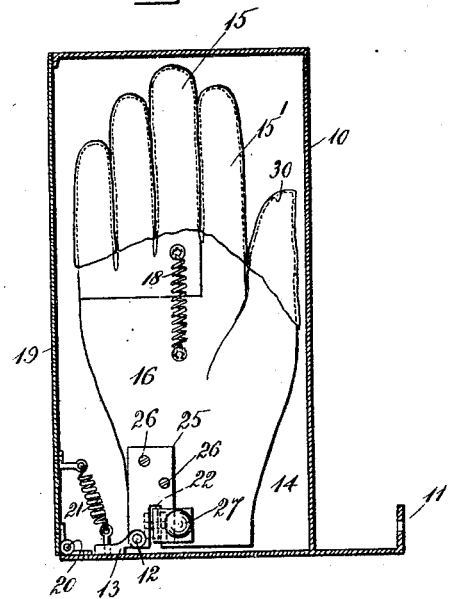
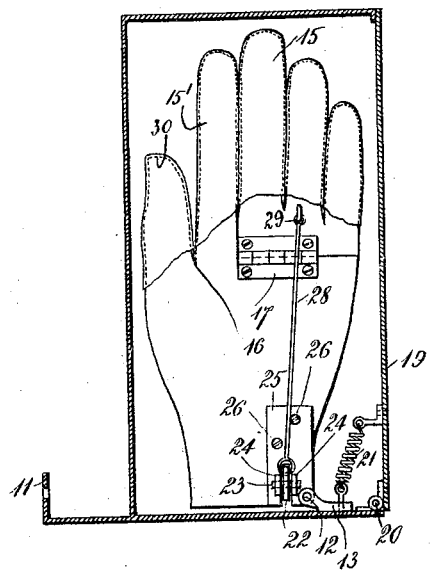
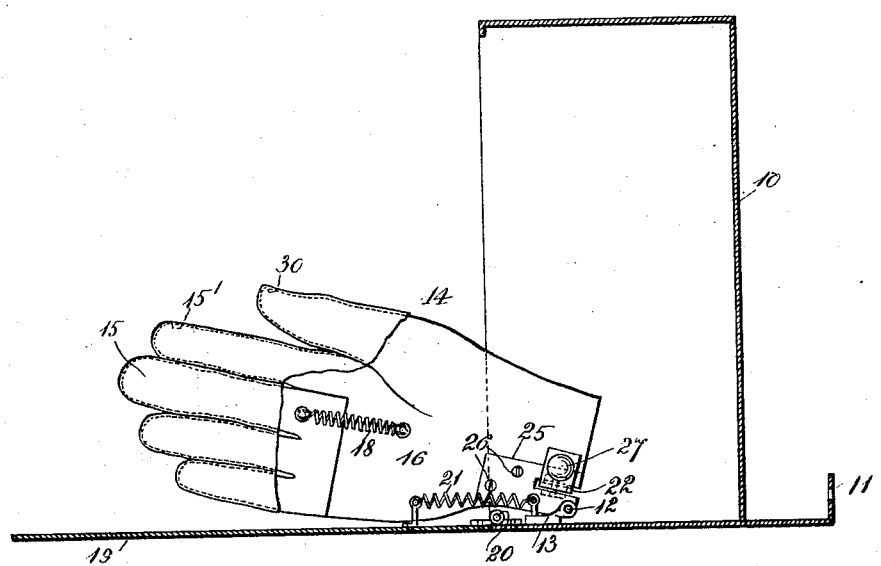
INVENTOR:
Robert C. Rose
By Geo. K. Woodworth
ATTORNEY Feb. 17, 1931.    R. C. ROSE    1,792,930
MOTOR CAR DIRECTION SIGNAL
Filed Sept. 17, 1930    2 Sheets-Sheet 2
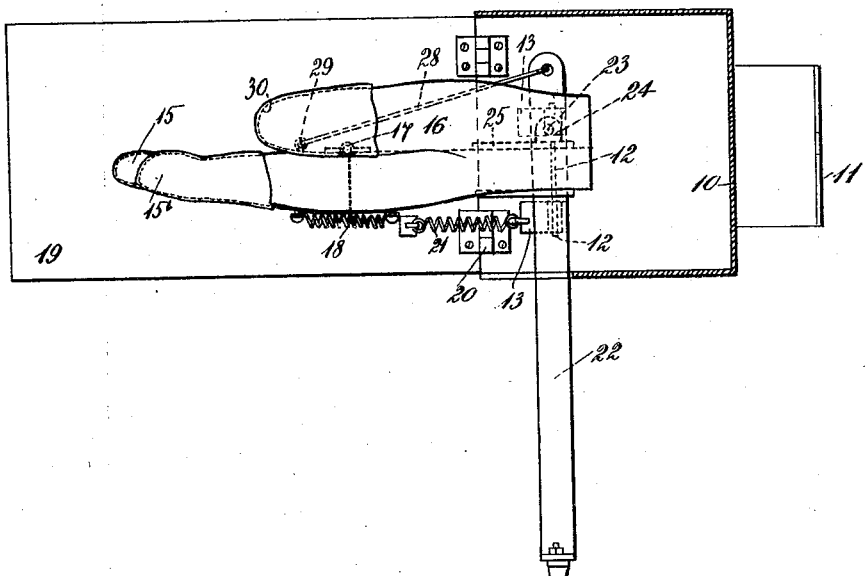
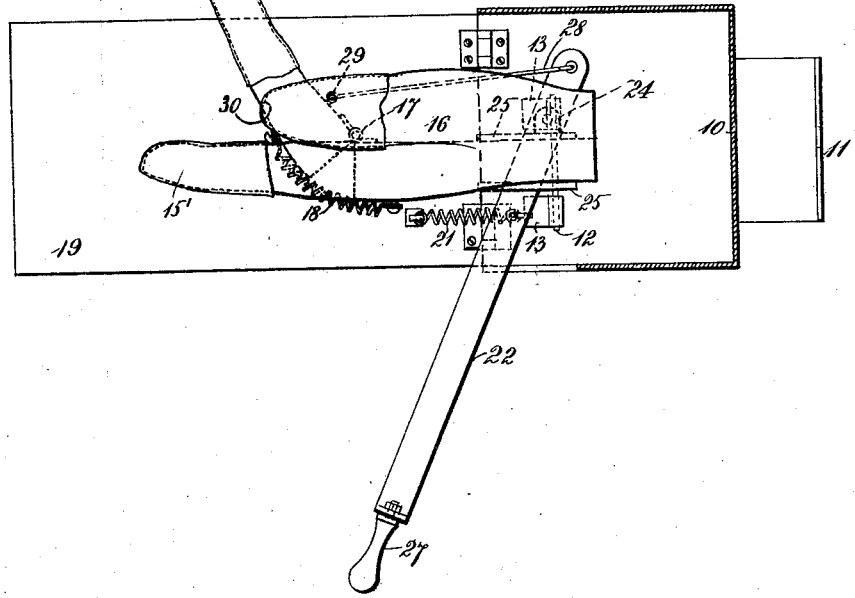
INVENTOR:
Robert C. Rose
BY Geo. K. Woodworth
ATTORNEY:

Patented Feb. 17, 1931

1,792,930

UNITED STATES PATENT OFFICE

ROBERT C. ROSE, OF WEYMOUTH, MASSACHUSETTS

MOTOR-CAR-DIRECTION SIGNAL

Application filed September 17, 1930. Serial No. 482,493.

The present invention relates to motor-car direction signals, and its object is to provide a simple device whereby the driver may indicate to others his intention to stop or slow down, or turn.

The salient feature of my invention consists of a two-part indicator which preferably is in the form of the human hand, having elastic means for maintaining the parts thereof, for example, the finger portion and the hand portion, in the same plane, together with means for moving one portion with respect to the other when the indicator is brought from a horizontal signalling position from its normal vertical non-signalling position, the movement of the outer or finger portion of said indicator showing that the driver is about to make a turn.

In the drawings which accompany and form a part of this specification I have shown one embodiment of my invention, but it is to be understood that various changes may be made both in form and in operating mechanism without departing from my invention as defined by the appended claims.

In the drawings—

Figure 1 is a front elevation partly in section of a motor-car direction-signal embodying my invention;

Fig. 2 is a rear elevation of the same partly in section;

Fig. 3 is a front elevation showing the indicator in signalling position;

Fig. 4 is a plan view showing the indicator in signalling position with the two parts thereof in substantially the same vertical plane; and Fig. 5 is a similar view showing the outer portion of the indicator after it has been moved out of the plane of the remaining portion.

In the particular drawings selected for more fully disclosing the principle of my invention, 10 represents a casing of pressed steel, or other suitable material which may be attached to some portion of an automobile within convenient reach of the driver by means of a bolt or screw passing through the flange 11. Pivotally mounted within said casing by means of the stud 12 which passes through the brackets 13, is an indicator 14, shown in the present instance as in the form of a hand having part of the finger portion 15 connected to the hand portion 16 by means of hinge 17, and the forefinger 15' integral therewith. Resilient means such as the spring 18 are provided for maintaining the two parts of the indicator in the same plane, and for bringing the outer or movable finger portion 15 back into the plane of the hand portion after the former has been moved out of the plane of the latter, as hereinafter more fully described. The front wall 19 of the casing is hinged to the latter, as indicated at 20, and the casing is maintained closed by the spring 21, the ends of which are attached respectively to said front wall and to the bracket 13 secured to the base of the casing. A lever 22 is pivotally connected to the indicator by the pivot 23 passing through the lugs 24 integral with the plate 25 secured to the indicator by screws or other attaching devices 26. The end of said lever is provided with a handle 27 and the other end thereof is pivotally connected by the rod 28 to the outer or finger portion of the indicator, as shown at 29. If the indicator is designed to simulate the human hand, I prefer to have the same covered with a glove, as indicated at 30, so as to give the impression to the drivers of following cars that it is the hand of the driver, and not a mechanical device that is giving the signal.

The operation is as follows: When the driver is about to slow down or stop his car, he grasps the handle 27 and rotates the lever in a counter-clockwise direction so as to turn the indicator about its pivot 12 from the vertical non-signal position shown in Fig. 1 to the horizontal or signalling position shown in Fig. 4, the movement of the hand serving to turn the closure 19 of the casing about its pivot against the tension of the spring 21, as indicated in Fig. 3. When the driver wishes to signal that he is about to turn, the lever, when the indicator is in horizontal position, is moved repeatedly backward and forward about its pivot to bring the end or movable finger portion 15 of the indicator to the position shown in Fig. 5, and then back to normal position (Fig. 4), the movable finger portion of the indicator being actuated by the rod 28 pivotally connected between said portion and the outer end of the lever, and by the spring 21.

It will be understood that the said indicator may be placed on either side of the car and that the movement of the outer portion 15 thereof will indicate a turn in either direction, the stationary finger 15 pointing to the direction in which the car is to turn, or that two such devices may be employed, one on the right and the other on the lefthand side of the automobile, in which case the finger movement of the lefthand indicator will signal a lefthand turn and that of the righthand indicator a righthand turn, the stationary fingers, respectively, pointing the direction of the turn.

Having thus disclosed an illustrative embodiment of my invention without however limiting the same thereto, what I claim and desire to secure by Letters Patent is:—

1. A motor-car direction-signal comprising in combination an indicator, means pivotally mounting said indicator in vertical non-signalling position, means for moving said indicator to horizontal signalling position, and means for imparting to the outer end of said indicator when in horizontal position a lateral movement with respect to the inner end portion thereof.

2. In a motor-car direction-signal a two-part indicator, means pivotally connecting the parts of said indicator, resilient means for maintaining the parts of said indicator in the same plane, and means for moving the outer part thereof out of said plane.

3. In a motor-car direction-signal, a two-part indicator in the form of the human hand, means pivotally connecting the finger portion thereof to the hand portion, resilient means for maintaining the parts of said indicator in the same plane, and means for moving the finger portion thereof laterally out of said plane.

4. In a motor-car direction-signal, a two-part indicator in the form of the human hand, the fore-finger thereof being integral with the hand portion, means pivotally connecting the movable portion consisting of the other three fingers to the hand portion, resilient means for maintaining the parts of said indicator in the same plane, and means for moving the movable finger portion thereof laterally out of said plane.

In testimony whereof, I have hereunto subscribed my name this 16th day of September, 1930.

ROBERT C. ROSE.